3,161,566
DIHYDROXYBENZOIC ACID FOR USE IN DELAMINATING EPITHELIUM

William Turkewitsch, Toronto, Ontario, Canada, assignor to The Scholl Mfg. Co., Inc., Chicago, Ill., a corporation of New York
No Drawing. Filed Sept. 11, 1961, Ser. No. 137,038
12 Claims. (Cl. 167—61)

The present invention relates to compositions for the removal of cornified epithelium of the human skin, in particular for the removal of hardened and thickened layers of keratin constituting corns and callouses.

Probably the most commonly used composition for treatment of this type includes salicylic acid in liquid or solid carriers. This composition is kept in contact with the keratinized skin for at least 48 hours after which the treated part becomes slightly marked, looks leathery and finally forms a blister which can be peeled off. However, this type of treatment leaves the living epidermis layers beneath the keratinized skin inflamed and red for weeks.

Still another class of substances which has been used for the purpose consists of the aromatic ethers and thioethers of aliphatic acids, such as phenoxy and phenylmercapto aliphatic acids and their derivatives. These materials also provide a very high irritation and inflammation after application, and frequently require a healing ointment to be applied after the keratinized skin has been removed.

The present invention deals with the removal of cornified epithelium of human skin with the use of compositions which are far less irritating and cause less inflammation than any of the aforementioned compositions heretofore used for this purpose.

An object of the present invention is to provide an improved composition for the delamination of cornified epithelium.

Another object of the invention is to provide an improved composition for delaminating cornified epithelium containing hydrophilic materials which do not require the water-proof covering frequently employed with materials used in the past for the same purposes.

A further object of the invention is to provide an improved method for delaminating cornified epithelium.

In accordance with the present invention, I have found that a substantially improved composition for the delamination of cornified epithelium results from the combination of a dihydroxy benzoic acid and a non-toxic resinous carrier. More specifically, I have found that such compositions, containing from 1 to 70% by weight of the dihydroxy benzoic acid on a dry basis cause considerably less irritation and inflammation than salicylic acid and the aromatic ethers and thio-ethers of aliphatic acids. To substantiate this, tests were made after the keratinized layers of the epidermis had been peeled off, by measuring the reflectance of the underlying epidermis by means of a Welch Densichron. After the application of the dihydroxy benzoic acid, the area from which the keratinized epidermis was removed was considerably more pale than the comparable areas treated with salicylic acid or aromatic ethers or thio-ethers of aliphatic acids.

All six isomeric forms of dihydroxy benzoic acid have been found to cause delamination of cornified epithelium. However, the two best materials, from the standpoint of effectiveness and economy, are the 2,4-dihydroxy benzoic acid, and 2,5-dihydroxy benzoic acid. These materials are quite hydrophilic, and the natural moisture content of keratinized skin is sufficient for their release and action when combined with the carriers to be described in a succeeding portion of this specification. The active substances loosen the keratinized layers from the living cells underneath, delaminate them and break up the dense structure of keratin into smaller units which can be peeled or even rubbed off. Hence, the compositions of the present invention do not require the water-proof covering which has commonly been employed in other types of keratin delaminating compositions.

In the normal treatment of corns and callouses, the concentration of the active ingredients should be on the order of approximately 10 to 70% by weight on a dry basis. However, lower concentrations on the order of 1 to 10% can also be used for application on sensitive areas, or in special dermatological cases. The excellent keratin delamination property possessed by these materials makes them suitable for use in skin and hair lotions and dusting powders.

The carriers which may be employed in the practice of the present invention are non-toxic resinous materials which are most preferably plasticized polyvinyl acetate, polyvinyl chloride, copolymers of polyvinyl acetate and chloride, or plasticized cellulosic ethers and esters. Typical cellulosic compounds include materials such as cellulose nitrate, cellulose acetate, cellulose propionate, cellulose butyrate acetate, employed individually, or in the form of mixtures. Typical concentrations of the resinous carriers range from about 4% to approximately 70% in the compositions of this invention.

Typical plasticizers for the keratin delamination products of the present invention include substances such as aklyl phthalates, phosphates, fatty acid esters, and other materials such as acetyl triethyl citrate, camphor, castor oil, ethylene oxide polymers, glycerine, and polyethylene glycols such as the "Carbowaxes." In general, the plasticizer concentration will be on the order of 5 to 50% by weight of the composition.

The most convenient means for incorporating the active material, the dihydroxy benzoic acid, into the carrier is to melt the resinous material containing the plasticizer, and add the active material to the melt at a temperature of about 150 to 200° F. The active material will then be dissolved or at least uniformly dispersed in the resulting composition.

The incorporation of the active material into the resinous carrier can be accomplished in either a heated vessel with stirring or kneading, or it can be done on a rubber mill. The product which results can be spread by means of a knife from a heated spreader or calendered, using various backing materials including films of the cellulose type, polyvinylidene, or other material which is resistant to the temperatures employed during the application of the active material and carrier to the base. Still other suitable carriers include various papers and non-woven fleece materials or woven fabrics.

Because the carriers do not flow readily, under the conditions of application, the materials can be spread in considerable thicknesses onto the backing, as high as 60 mils. Still another method of application involves the extrusion of the heated plastic containing the active ingredient in rods and cutting off disks of the desired thickness from the extruded rods.

Another method of preparation involves making a plasticol from a polyvinyl chloride, for example, spreading it into suitable thickness, and fusing. The product may then be applied to materials such as a foamed plastic and fused to it.

If desired, the adhesion of the keratin delamination product of the present invention can be improved by the addition of small amounts of tackifiers such as polyvinyl pyrrolidone or ethylene oxide polymers of the type known commercially as "Polyox." The preferred concentration of such tackifying agents is in the range from 2 to 10% by weight.

While the preferred embodiment of the invention involves the use of the active material in combination with a solid resinous carrier is also possible to employ the active ingredient in a liquid carrier such as collodion, a solution of nitrated cellulose in ether and alcohol. Typical plasticizers for this type of combination include camphor and castor oil. A concentration of active material of about 10 to 15% by weight in the liquid form will result in a concentration, after volatilization of the liquids, on the order of 53 to 64% by weight on a dry basis.

The following specific examples illustrate various formulations which can be employed in the practice of the present invention.

Example I

| | Percent by weight |
|---|---|
| Polyvinyl acetate (Bakelite AYAA) | 33.33 |
| Dimethyl phthalate | 33.33 |
| Dihydroxy benzoic acid | 33.34 |

Example II

| | |
|---|---|
| Polyvinyl acetate (Bakelite AYAF) | 41.0 |
| Dibutyl phthalate | 13.6 |
| Polyvinyl pyrrolidone | 4.5 |
| "Carbowax 4000" | 9.1 |
| Dihydroxy benzoic acid | 31.8 |

Example III

| | |
|---|---|
| Polyvinyl acetate (Bakelite AYAF) | 33.3 |
| "Polyox" Resin WSR 35 | 33.3 |
| Dihydroxy benzoic acid | 33.4 |

Example IV

| | |
|---|---|
| Polyvinyl acetate (Bakelite AYAF) | 46.0 |
| Dibutyl phthalate | 15.3 |
| "Polyox" Resin WSR 35 | 5.1 |
| Dihydroxy benzoic acid | 33.6 |

Example V

| | |
|---|---|
| Polyvinyl acetate (Bakelite AYAF) | 46.0 |
| "Polyox" Resin WSR 35 | 5.1 |
| Sucrose acetate isobutyrate | 15.3 |
| Dihydroxy benzoic acid | 33.6 |

Example VI

| | |
|---|---|
| Cellulose acetate | 20.0 |
| Dimethyl phthalate | 46.66 |
| Dihydroxy benzoic acid | 33.34 |

Example VII

| | |
|---|---|
| Cellulose propionate | 21.5 |
| Dibutyl phthalate | 20.5 |
| Camphor | 10.8 |
| Urea | 10.8 |
| Dihydroxy benzoic acid | 36.4 |

Example VIII

| | |
|---|---|
| Cellulose propionate | 16.1 |
| Ethyl cellulose | 16.1 |
| Dibutyl phthalate | 21.3 |
| Polyvinyl pyrrolidone | 2.6 |
| Glycerine | 10.6 |
| Dihydroxy benzoic acid | 33.3 |

Example IX

| | |
|---|---|
| Polyvinyl acetate (Bakelite AYAF) | 69.0 |
| Dibutyl phthalate | 22.5 |
| "Polyox" Resin WSR 35 | 7.5 |
| Dihydroxy benzoic acid | 1.0 |

Example X

| | |
|---|---|
| Collodion (5% pyroxylin, 2% camphor, 3% castor oil, 90% ether and alcohol) | 85.8 |
| Dihydroxy benzoic acid | 14.2 |
| Active material in dry product | 63.3 |

Example XI

| | Percent by weight |
|---|---|
| Polyvinyl chloride ("Geon 121") | 39.2 |
| Organic cadmium compound (stabilizer) | 1.9 |
| Dibutyl phthalate | 26.2 |
| 2,4-dihydroxy benzoic acid | 32.7 |

Example XII

| | |
|---|---|
| Polyvinyl acetate resin | 9.4 |
| Polyvinyl chloride resin | 18.8 |
| Organic tin compound (stabilizer) | 1.4 |
| Dibutyl phthalate | 37.6 |
| 2,4-dihydroxy benzoic acid | 32.8 |

Example XIII

| | |
|---|---|
| Polyvinyl chloride resin | 32.6 |
| Vinyl stabilizer ("Nuodex 134") | 2.2 |
| Dibutyl phthalate | 32.6 |
| 2,4-dihydroxy benzoic acid | 32.6 |

Example XIV

| | |
|---|---|
| Polyvinyl chloride resin | 50.0 |
| Dibutyl phthalate | 16.7 |
| 2,4-dihydroxy benzoic acid | 33.3 |

Example XV

| | |
|---|---|
| Polyvinyl chloride acetate copolymer ("Bakelite VMCH") | 44.5 |
| Dibutyl phthalate | 22.2 |
| 2,4-dihydroxy benzoic acid | 33.3 |

Example XVI

| | |
|---|---|
| Polyvinyl acetate resin ("Butvar B-73") | 33.3 |
| Dibutyl phthalate | 33.3 |
| 2,4-dihydroxy benzoic acid | 33.4 |

It will be evident that various modifications can be made to the described embodiments without departing from the scope of the present invention.

I claim as my invention:

1. A composition for the delamination of cornified epithelium comprising one of the six isomers of dihydroxy benzoic acid in an amount sufficient to delaminate said epithelium and a non-toxic resinous carrier, selected from the group consisting of vinyl resins and cellulosic ethers and esters.

2. A composition for the delamination of cornified epithelium comprising one of the six isomers of dihydroxy benzoic acid and a non-toxic resinous carrier selected from the group consisting of vinyl resins and cellulosic ethers and esters, said composition containing from 1 to 70% by weight of said dihydroxy benzoic acid on a dry basis.

3. A composition for the delamination of cornified epithelium comprising 2,4-dihydroxy benzoic acid in an amount sufficient to delaminate said epithelium and a non-toxic resinous carrier selected from the group consisting of vinyl resins and cellulosic ethers and esters.

4. A composition for the delamination of cornified epithelium comprising 2,5-dihydroxy benzoic acid in an amount sufficient to delaminate said epithelium and a non-toxic resinous carrier selected from the group consisting of vinyl resins and cellulosic ethers and esters.

5. A composition for the delamination of cornified epithelium comprising one of the six isomers of dihydroxy benzoic acid in an amount sufficient to delaminate said epithelium and a vinyl resin.

6. A composition for the delamination of cornified epithelium comprising one of the six isomers of dihydroxy benzoic acid in an amount sufficient to delaminate said epithelium and a cellulosic ester.

7. A composition for the delamination of cornified epithelium comprising one of the six isomers of dihydroxy benzoic acid in an amount sufficient to delaminate said epithelium and a cellulosic ether.

8. A composition for the delamination of cornified epithelium comprising one of the six isomers of dihydroxy benzoic acid in an amount sufficient to delaminate said epithelium and collodion.

9. The composition of claim 5 in which said dihydroxy benzoic acid constitutes from 1 to 70% by weight of said composition on a dry basis.

10. A composition for the delamination of cornified epithelium comprising 2,4-dihydroxy benzoic acid and a vinyl resin, said acid constituting from 1 to 70% by weight of said composition.

11. The method of delaminating cornified epithelium which comprises applying to said epithelium a composition comprising one of the six isomers of dihydroxy benzoic acid and a non-toxic resinous carrier, retaining said composition on the epithelium until the keratinized layers become delaminated, and then removing the keratinized layers.

12. The method of delaminating cornified epithelium which comprises applying to said epithelium a composition comprising 2,4-dihydroxy benzoic acid and a non-toxic resinous carrier, said acid constituting from 1 to 70% by weight of said composition, retaining said composition on the epithelium until the keratinized layers become delaminated, and then removing the keratinized layers.

References Cited in the file of this patent

The Merck Index, 7th edition, 1960, Rahway, New Jersey, pages 902 and 476.